United States Patent

(12) United States Patent
Nguyen

(10) Patent No.: US 7,251,677 B1
(45) Date of Patent: *Jul. 31, 2007

(54) ACTIVE ELECTRONIC MAIL

(75) Inventor: Julien T. Nguyen, Saratoga, CA (US)

(73) Assignee: Beryl Technical Assays LLC, Las Vegas, NV (US)

( * ) Notice: Subject to any disclaimer, the term of this patent is extended or adjusted under 35 U.S.C. 154(b) by 312 days.

This patent is subject to a terminal disclaimer.

(21) Appl. No.: 10/187,053

(22) Filed: Jun. 28, 2002

Related U.S. Application Data

(63) Continuation of application No. 08/918,698, filed on Aug. 21, 1997, now Pat. No. 6,542,923.

(51) Int. Cl.
G06F 15/16 (2006.01)

(52) U.S. Cl. ...................................... 709/206

(58) Field of Classification Search ........ 709/204–207; 715/513, 541, 749, 752; 345/749, 752
See application file for complete search history.

(56) References Cited

U.S. PATENT DOCUMENTS

| 5,548,745 | A | * | 8/1996 | Egan et al. ................ 703/27 |
| 5,572,648 | A | * | 11/1996 | Bibayan .................... 345/825 |
| 5,619,648 | A | | 4/1997 | Canale et al. |
| 5,706,502 | A | * | 1/1998 | Foley et al. ............... 707/10 |
| 5,732,218 | A | * | 3/1998 | Bland et al. ............... 709/224 |
| 5,794,039 | A | | 8/1998 | Guck |
| 5,845,299 | A | * | 12/1998 | Arora et al. ............... 715/513 |
| 5,859,967 | A | * | 1/1999 | Kaufeld et al. ............ 713/200 |
| 5,898,836 | A | * | 4/1999 | Freivald et al. ............ 709/218 |
| 5,940,834 | A | * | 8/1999 | Pinard et al. .............. 707/102 |
| 6,009,462 | A | * | 12/1999 | Birrell et al. .............. 709/206 |
| 6,014,688 | A | | 1/2000 | Venkatraman et al. |
| 6,029,164 | A | * | 2/2000 | Birrell et al. .............. 707/3 |
| 6,032,150 | A | * | 2/2000 | Nguyen ..................... 707/102 |
| 6,067,579 | A | * | 5/2000 | Hardman et al. .......... 719/328 |
| 6,073,163 | A | * | 6/2000 | Clark et al. ............... 709/203 |
| 6,131,116 | A | * | 10/2000 | Riggins et al. ............ 709/219 |
| 6,185,551 | B1 | * | 2/2001 | Birrell et al. .............. 707/3 |
| 6,212,535 | B1 | * | 4/2001 | Weikart et al. ............ 715/513 |
| 6,377,978 | B1 | | 4/2002 | Nguyen |
| 6,401,134 | B1 | * | 6/2002 | Razavi et al. ............. 719/310 |
| 6,542,923 | B2 | | 4/2003 | Nguyen |
| 6,601,108 | B1 | * | 7/2003 | Marmor .................... 709/246 |

(Continued)

OTHER PUBLICATIONS

McNamara, "Start-up Novita Makes Multimedia E-mail a Snap," Dec. 9, 1996, Network World, vol. 13, Iss. 50, p. 31.*

(Continued)

Primary Examiner—Moustafa M. Meky
Assistant Examiner—Sean Reilly

(57) ABSTRACT

The invention provides a method and system for formatting electronic mail for transmission, in which electronic mail messages include the operational results of one or more applets. An electronic mail client creates an electronic mail message using one or more applets, each of which may operate to actively receive, transform, and display information to be presented with the electronic mail message. At or near a time when the electronic mail message is formatted for transmission, editable program code for the applets is removed, and any dynamic links between the applets are broken. The electronic mail message made available to the receiver can thus include active elements, but any applets which are received are not editable by the receiver.

98 Claims, 1 Drawing Sheet

U.S. PATENT DOCUMENTS 6,718,321 B2 *  4/2004  Birrell et al. .................. 707/2
6,779,178 B1 *  8/2004  Lloyd et al. ................ 717/174
2002/0059447 A1  5/2002  Nguyen

OTHER PUBLICATIONS

Doan, "Lotus Demonstrates cc:Mail for java Prototype Client," Dec. 16, 1996, InfoWorld, vol. 18, Iss. 51, p. 47.*

Doan, "Java Perks Up Client Mail," Oct. 14, 1996, InfoWorld, vol. 18, Iss. 42, pp. 1ff.*

Developers at Sun.com, "Applets," from http://java.sun.com/applets, printed Feb. 25, 2005.*

* cited by examiner

ACTIVE ELECTRONIC MAIL

This application is a continuation of application Ser. No. 08/918,698 filed Aug. 21, 1997, now U.S. Pat. No. 6,542,923.

BACKGROUND OF THE INVENTION

1. Field of Invention

The invention relates to electronic mail.

2. Related Art

"Electronic mail" is a technique in which messages are delivered between computers (or within a single computer), destined to be read by individual users. In addition to sending messages which are just text, it has recently become known to send messages which include additional information, such as text font information and graphical elements. It would be advantageous to include active elements in electronic mail, such as programs which are able to run on the receiving computer.

For example, an "applet" is a program which is able to be transmitted using a network of computers and executed at the receiving computer. In the Java programming language environment (and for other applet programming language environments such as ActiveX), each applet includes an editable program and a graphical display image. While it would be advantageous to be able to transmit applets using electronic mail, it is often not desirable to transmit the editable program portion of the applet.

An aspect of this problem is that there are many operations in which applets might be useful in electronic mail, such as providing dynamically updated information, providing templates for creating replies, transmitting to mailing lists, and the like. However, in many cases the power of providing these operations using applets is itself a strong reason not to provide the applet code to the electronic mail recipient.

Accordingly, it would be desirable to provide a method and system for transmitting electronic mail which includes the operational results of one or more applets. This advantage is achieved in an embodiment of the invention in which links between applets and links within a applet, which are unnecessary to display of the information desired by the sender to be presented with the electronic mail, are broken at or near a time when the electronic mail is formatted for transmission.

SUMMARY OF INVENTION

The invention provides a method and system for formatting electronic mail for transmission, in which electronic mail messages include the operational results of one or more applets. An electronic mail client creates an electronic mail message using one or more applets, each of which may operate to actively receive, transform, and display information to be presented with the electronic mail message. At or near a time when the electronic mail message is formatted for transmission, editable program code for the applets is removed, and any dynamic links between the applets are broken. The electronic mail message made available to the receiver can thus include active elements, but any applets which are received are not editable by the receiver.

DETAILED DESCRIPTION OF THE PREFERRED EMBODIMENT

Figure 1:
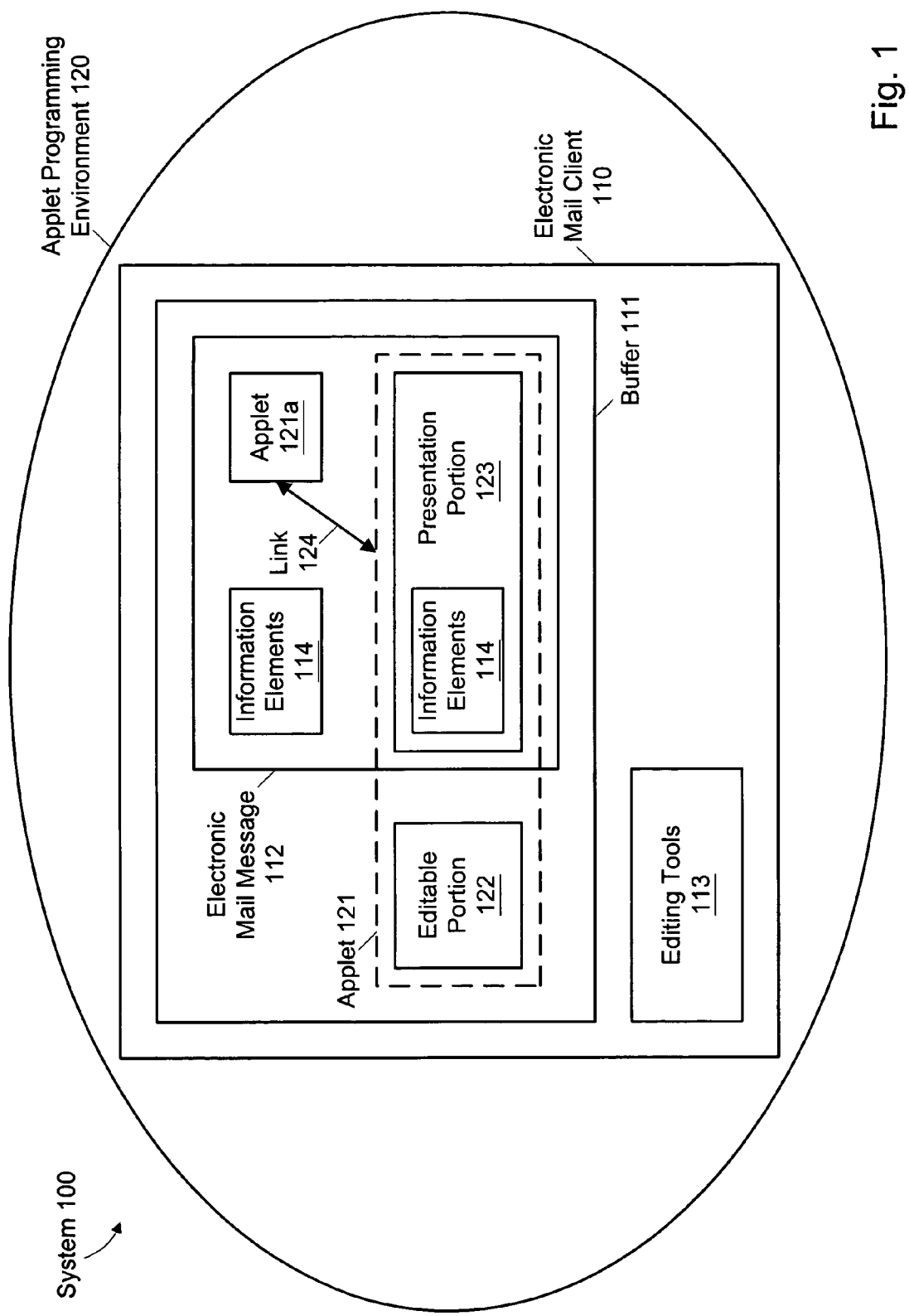
FIG. 1 shows a block diagram of a system including an electronic mail client with an electronic mail message including applets.

In the following description, a preferred embodiment of the invention is described with regard to preferred process steps and data structures. Those skilled in the art would recognize after perusal of this application that embodiments of the invention can be implemented using general purpose processors or special purpose processors adapted to particular process steps and data structures described herein, and that implementation of the process steps and data structures described herein would not require undue experimentation or further invention.

Inventions described herein can be used in conjunction with inventions described in the following applications:

Application Ser. No. 08/918,096, filed Aug. 21, 1997, in the name of the same inventor, titled "Micro-Client For Internet Appliance", now U.S. Pat. No. 6,564,250; and Application Ser. No. 08/918,094, filed Aug. 21, 1997, in the name of the same inventor, titled "Secure Graphical Objects in Web Documents", now U.S. Pat. No. 6,032,150.

Each of these applications is hereby incorporated by reference as if fully set forth herein.

Electronic Mail Client and Messages

FIG. 1 shows a block diagram of a system including an electronic mail client with an electronic mail message including applets.

In a system 100 including an electronic mail client 110 and an applet programming environment 120, the electronic mail client 110 includes a buffer 111 for creating an electronic mail message 112, and a set of editing tools 113 for editing the electronic mail message 112.

As used herein, the term "electronic mail" as used in the phrases "electronic mail client", "electronic mail message", and the like, refers to information transfer using one of several electronic mail protocols, and ententions and variants thereof. These electronic mail protocols include, for example, the POP3 and SMTP electronic mail protocols.

The reader is cautioned that electronic mail protocols are rapidly evolving, with many new protocols, many variants and many extentions, modifications, and variants thereof, both official and unofficial. Some of these extensions, modifications, and variants include those which have security features, those which are particular to certain languages or character sets, those which are particular to certain display features, and so on. Not all electronic mail clients or servers are compatible with all extensions, modifications, and variants of all electronic mail protocols, and it is expected both that further electronic mail protocols, as well as extensions, modifications, and variants of electronic mail protocols will continue to develop, and that this lack of industry-wide compatibility will continue for the near future.

Those skilled in the art would be aware, after perusing this application, that the invention is applicable to all such extensions, modifications, and variants of electronic mail protocol, without undue experimentation or further invention, and that the scope and spirit of the invention is broad enough to encompass all such applications.

The electronic mail message 112 includes a set of information elements 114, such as text elements or graphical elements. The information elements 114 can communicate information to a recipient of the electronic mail message 112.

The electronic mail message 112 can also include an applet 121, which includes an editable portion 122 and a presentation portion 123. The editable portion 122 includes program code and data structures for the applet 121, such as in the Java programming environment or another means for applet program specification such as the ActiveX programming environment. The presentation portion 123 includes further information elements 114, such as text elements or graphical elements, which are produced by the applet 121 for ultimate presentation to the recipient of the electronic mail message 112.

When the electronic mail message 112 is formatted for transmission, the electronic mail client 110 breaks the link between the editable portion 122 of the applet 121 and the presentation portion 123 of the applet 121. Only the presentation portion 123 of the applet 121 is included in the electronic mail message 112 when transmitted.

The electronic mail message 112 before formatting for transmission can include multiple applets, such as applets 121 and 121a shown in FIG. 1. For example, the electronic mail message can be generated based on a formatting template for the electronic mail message 112. In other words, the electronic mail message 112 itself (before formatting for transmission) can include not only text, but also applets from the formatting template. In this arrangement, individual fields of the electronic mail message 112 each can be implemented or generated by an applet 121 which receives, transforms, and formats information for inclusion in the electronic mail message 112.

For example, a "reply" formatting template can include an applet 121 which is included in the electronic mail message itself. This "reply" template can receive header information from the electronic mail message being replied to and transform that header information into header information for the reply.

When the electronic mail message 112 is formatted for transmission, the electronic mail client 110 sends only transformed information, thus, only the information for each field after it has been transformed by the applet 121, rather than the applet 121 itself. For a first example, a signature applet 121 can receive a signature from the user of the electronic mail client 110, and in response generate a graphical element (such as in a GIF format, JPEG format, or animation format) for inclusion in the electronic mail message 112, and the transmitted electronic mail message 112 would include only the generated graphical element, not the applet 121. For a second example, a graphical editing applet can receive a graphical element (such as in the GIF format, JPEG format, or animation format) and apply editing tools to that graphical element to transform it for inclusion in the electronic mail message 112.

The electronic mail message 112 can also include multiple applets with one or more communication links between various ones of the applets. For example, the electronic mail message 121 could include multiple applets 121 and 121a connected by communication link 124. A first applet 121 could receive text information and a second applet 121a could transform that text into a graphical element (or retrieves information from a database or file system) for inclusion in the electronic mail message 112. For example, the "reply" formatting template can include an addressing applet which retrieves an address for the recipient, and can include a mailing list applet which retrieves a set of addresses for a mailing list of recipients.

When the electronic mail message 112 is formatted for transmission, the electronic mail client 110 breaks the communication links 124 between pairs of the applets 121. Again, only the presentation portions of each of the applets are included in the electronic mail message 112.

Alternative Embodiments

Although preferred embodiments are disclosed herein, many variations are possible which remain within the concept, scope, and spirit of the invention, and these variations would become clear to those skilled in the art after perusal of this application.

The invention claimed is:

1. A method, comprising:
constructing an electronic mail message, wherein said electronic mail message includes a first plurality of applets linked by one or more links, wherein the first plurality of applets includes a first applet configured to receive text information and a second applet linked to the first applet by a first link, wherein said second applet is configured to transform the received text information into a graphical element; and
formatting the electronic mail message for transmission; wherein the formatted electronic mail message includes the second applet, but not the first applet or the first link.

2. The method of claim 1, wherein said second applet includes said graphical element.

3. The method of claim 1, wherein at least said first applet is a Java applet.

4. The method of claim 1, wherein at least said first applet is an ActiveX applet.

5. The method of claim 1, further comprising transmitting the formatted electronic mail message.

6. The method of claim 1, wherein the first plurality of applets includes a third applet linked to the first applet by a second link, and wherein the formatted electronic mail message further includes the third applet, but not the second link.

7. The method of claim 1, wherein said first link is a dynamic link, and wherein said formatting includes breaking said first link.

8. The method of claim 1, wherein the electronic mail message includes a second plurality of applets linked by one or more links, and wherein the formatted electronic mail message includes one or more of the second plurality of applets, and wherein the formatted electronic mail message does not include at least one of the one or more links linking the second plurality of applets.

9. An apparatus, comprising:
a processor; and
memory coupled to the processor, wherein the memory includes program instructions executable by the processor to:
construct an electronic mail message, wherein said electronic mail message includes a first plurality of applets linked by one or more links, wherein the first plurality of applets includes a first applet configured to receive text information and a second applet linked to the first applet by a first link, wherein said second applet is configured to transform the received text information into a graphical element; and format the electronic mail message for transmission;
wherein the formatted electronic mail message includes at least the second applet, but not the first applet or the first link.

10. The apparatus of claim 9, wherein said second applet includes said graphical element.

11. The apparatus of claim 9, wherein at least said first applet is a Java applet.

12. The apparatus of claim 9, wherein at least said first applet is an ActiveX applet.

13. The apparatus of claim 9, wherein the memory includes program instructions executable by the processor to transmit the formatted electronic mail message.

14. The apparatus of claim 9, wherein the first plurality of applets includes a third applet linked to the first applet by a second link, and wherein the formatted electronic mail message further includes the third applet, but not the second link.

15. The apparatus of claim 9, wherein said first link is a dynamic link, and wherein said memory includes program instructions executable by the processor to break said first link.

16. The apparatus of claim 9, wherein the electronic mail message includes a second plurality of applets linked by one or more links, and wherein the formatted electronic mail message includes one or more of the second plurality of applets, and wherein the formatted electronic mail message does not include at least one of the one or more links linking the second plurality of applets.

17. A computer readable medium comprising program instructions, wherein the instructions are computer-executable to:
construct an electronic mail message, wherein said electronic mail message includes a first plurality of applets linked by one or more links, wherein the first plurality of applets includes a first applet configured to receive text information and a second applet linked to the first applet by a first link, wherein said second applet is configured to transform the received text information into a graphical element; and
format the electronic mail message for transmission;
wherein the formatted electronic mail message includes at least the second applet, but not the first applet or the first link.

18. The computer readable medium of claim 17, wherein said second applet includes said graphical element.

19. The computer readable medium of claim 17, wherein at least said first applet is a Java applet.

20. The computer readable medium of claim 17, wherein at least said first applet is an ActiveX applet.

21. The computer readable medium of claim 17, wherein the instructions are computer-executable to transmit the formatted electronic mail message.

22. The computer readable medium of claim 17, wherein the first plurality of applets includes a third applet linked to the first applet by a second link, and wherein the formatted electronic mail message further includes the third applet, but not the second link.

23. The computer readable medium of claim 17, wherein said first link is a dynamic link, and wherein said instructions are computer-executable to break said first link.

24. The computer readable medium of claim 17, wherein the electronic mail message includes a second plurality of applets linked by one or more links, and wherein the formatted electronic mail message includes one or more of the second plurality of applets, and wherein the formatted electronic mail message does not include at least one of the one or more links linking the second plurality of applets.

25. A method, comprising:
constructing an electronic mail message, wherein said electronic mail message includes a first plurality of applets linked by one or more links, wherein the first plurality of applets includes a first applet configured to receive text information and a second applet linked to the first applet by a first link, wherein said second applet is configured to retrieve information from a database using the received text information; and
formatting the electronic mail message for transmission;
wherein the formatted electronic mail message includes at least the second applet, but not the first applet or the first link.

26. The method of claim 25, wherein said second applet includes said retrieved information.

27. The method of claim 25, wherein at least said first applet is a Java applet.

28. The method of claim 25, wherein at least said first applet is an ActiveX applet.

29. The method of claim 25, further comprising transmitting the formatted electronic mail message.

30. The method of claim 25, wherein the first plurality of applets includes a third applet linked to the first applet by a second link, and wherein the formatted electronic mail message further includes the third applet, but not the second link.

31. The method of claim 25, wherein said first link is a dynamic link, and wherein said formatting includes breaking said first link.

32. The method of claim 25, wherein the electronic mail message includes a second plurality of applets linked by one or more links, and wherein the formatted electronic mail message includes one or more of the second plurality of applets, and wherein the formatted electronic mail message does not include at least one of the one or more links linking the second plurality of applets.

33. An apparatus, comprising:
a processor; and
memory coupled to the processor, wherein the memory includes program instructions executable by the processor to:
construct an electronic mail message, wherein said electronic mail message includes a first plurality of applets linked by one or more links, wherein the first plurality of applets includes a first applet configured to receive text information and a second applet linked to the first applet by a first link, wherein said second applet is configured to retrieve information from a database using the received text information; and
format the electronic mail message for transmission;
wherein the formatted electronic mail message includes at least the second applet, but not the first applet or the first link.

34. The apparatus of claim 33, wherein said second applet includes said retrieved information.

35. The apparatus of claim 33, wherein at least said first applet is a Java applet.

36. The apparatus of claim 33, wherein at least said first applet is an ActiveX applet.

37. The apparatus of claim 33, wherein the memory includes program instructions executable by the processor to transmit the formatted electronic mail message.

38. The apparatus of claim 33, wherein the first plurality of applets includes a third applet linked to the first applet by a second link, and wherein the formatted electronic mail message further includes the third applet, but not the second link.

39. The apparatus of claim 33, wherein said first link is a dynamic link, and wherein said memory includes program instructions executable by the processor to break said first link.

40. The apparatus of claim 33, wherein the electronic mail message includes a second plurality of applets linked by one or more links, and wherein the formatted electronic mail message includes one or more of the second plurality of applets, and wherein the formatted electronic mail message does not include at least one of the one or more links linking the second plurality of applets.

41. A computer readable medium comprising program instructions, wherein the instructions are computer-executable to:
  construct an electronic mail message, wherein said electronic mail message includes a first plurality of applets linked by one or more links, wherein the first plurality of applets includes a first applet configured to receive text information and a second applet linked to the first applet by a first link, wherein said second applet is configured to retrieve information from a database using the received text information; and
  format the electronic mail message for transmission;
  wherein the formatted electronic mail message includes at least the second applet, but not the first applet or the first link.

42. The computer readable medium of claim 41, wherein said second applet includes said retrieved information.

43. The computer readable medium of claim 41, wherein at least said first applet is a Java applet.

44. The computer readable medium of claim 41, wherein at least said first applet is an ActiveX applet.

45. The computer readable medium of claim 41, wherein the instructions are computer-executable to transmit the formatted electronic mail message.

46. The computer readable medium of claim 41, wherein the first plurality of applets includes a third applet linked to the first applet by a second link, and wherein the formatted electronic mail message further includes the third applet, but not the second link.

47. The computer readable medium of claim 41, wherein said first link is a dynamic link, and wherein said instructions are computer-executable to break said first link.

48. The computer readable medium of claim 41, wherein the electronic mail message includes a second plurality of applets linked by one or more links, and wherein the formatted electronic mail message includes one or more of the second plurality of applets, and wherein the formatted electronic mail message does not include at least one of the one or more links linking the second plurality of applets.

49. A method, comprising:
  constructing an electronic mail message, wherein said electronic mail message includes a first plurality of applets linked by one or more links, wherein the first plurality of applets includes a first applet configured to receive text information and a second applet linked to the first applet by a first link, wherein said second applet is configured to retrieve information from a file system using the received text information; and
  formatting the electronic mail message for transmission;
  wherein the formatted electronic mail message includes at least the second applet, but not the first applet or the first link.

50. The method of claim 49, wherein said second applet includes said retrieved information.

51. The method of claim 49, wherein at least said first applet is a Java applet.

52. The method of claim 49, wherein at least said first applet is an ActiveX applet.

53. The method of claim 49, further comprising transmitting the formatted electronic mail message.

54. The method of claim 49, wherein the first plurality of applets includes a third applet linked to the first applet by a second link, and wherein the formatted electronic mail message further includes the third applet, but not the second link.

55. The method of claim 49, wherein said first link is a dynamic link, and wherein said formatting includes breaking said first link.

56. The method of claim 49, wherein the electronic mail message includes a second plurality of applets linked by one or more links, and wherein the formatted electronic mail message includes one or more of the second plurality of applets, and wherein the formatted electronic mail message does not include at least one of the one or more links linking the second plurality of applets.

57. An apparatus, comprising:
  a processor; and
  memory coupled to the processor, wherein the memory includes program instructions executable by the processor to:
    construct an electronic mail message, wherein said electronic mail message includes a first plurality of applets linked by one or more links, wherein the first plurality of applets includes a first applet configured to receive text information and a second applet linked to the first applet by a first link, wherein said second applet is configured to retrieve information from a file system using the received text information; and
    format the electronic mail message for transmission;
    wherein the formatted electronic mail message includes at least the second applet, but not the first applet or the first link.

58. The apparatus of claim 57, wherein said second applet includes said retrieved information.

59. The apparatus of claim 57, wherein at least said first applet is a Java applet.

60. The apparatus of claim 57, wherein at least said first applet is an ActiveX applet.

61. The apparatus of claim 57, wherein the memory includes program instructions executable by the processor to transmit the formatted electronic mail message.

62. The apparatus of claim 57, wherein the first plurality of applets includes a third applet linked to the first applet by a second link, and wherein the formatted electronic mail message further includes the third applet, but not the second link.

63. The apparatus of claim 57, wherein said first link is a dynamic link, and wherein said memory includes program instructions executable by the processor to break said first link.

64. The apparatus of claim 57, wherein the electronic mail message includes a second plurality of applets linked by one or more links, and wherein the formatted electronic mail message includes one or more of the second plurality of applets, and wherein the formatted electronic mail message does not include at least one of the one or more links linking the second plurality of applets.

65. A computer readable medium comprising program instructions, wherein the instructions are computer-executable to:
  construct an electronic mail message, wherein said electronic mail message includes a first plurality of applets linked by one or more links, wherein the first plurality of applets includes a first applet configured to receive text information and a second applet linked to the first applet by a first link, wherein said second applet is configured to retrieve information from a file system using the received text information; and
  format the electronic mail message for transmission;
  wherein the formatted electronic mail message includes at least the second applet, but not the first applet or the first link.

66. The computer readable medium of claim 65, wherein said second applet includes said retrieved information.

67. The computer readable medium of claim 65, wherein at least said first applet is a Java applet.

68. The computer readable medium of claim 65, wherein at least said first applet is an ActiveX applet.

69. The computer readable medium of claim 65, wherein the instructions are computer-executable to transmit the formatted electronic mail message.

70. The computer readable medium of claim 65, wherein the first plurality of applets includes a third applet linked to the first applet by a second link, and wherein the formatted electronic mail message further includes the third applet, but not the second link.

71. The computer readable medium of claim 65, wherein said first link is a dynamic link, and wherein said instructions are computer-executable to break said first link.

72. The computer readable medium of claim 65, wherein the electronic mail message includes a second plurality of applets linked by one or more links, and wherein the formatted electronic mail message includes one or more of the second plurality of applets, and wherein the formatted electronic mail message does not include at least one of the one or more links linking the second plurality of applets.

73. A method, comprising:
  constructing an electronic mail message, wherein said electronic mail message includes a first plurality of applets linked by one or more links, wherein the first plurality of applets includes a first applet configured to receive a graphical element and a second applet linked to the first applet by a first link, wherein the second applet is configured to transform the received graphical element for inclusion in the electronic mail message; and
  formatting the electronic mail message for transmission;
  wherein the formatted electronic mail message includes at least the second applet, but not the first applet or the first link.

74. The method of claim 73, wherein said second applet includes said transformed graphical element.

75. The method of claim 73, wherein at least said first applet is a Java applet.

76. The method of claim 73, wherein at least said first applet is an ActiveX applet.

77. The method of claim 73, further comprising transmitting the formatted electronic mail message.

78. The method of claim 73, wherein the first plurality of applets includes a third applet linked to the first applet by a second link, and wherein the formatted electronic mail message further includes the third applet, but not the second link.

79. The method of claim 73, wherein said first link is a dynamic link, and wherein said formatting includes breaking said first link.

80. The method of claim 73, wherein the electronic mail message includes a second plurality of applets linked by one or more links, and wherein the formatted electronic mail message includes one or more of the second plurality of applets, and wherein the formatted electronic mail message does not include at least one of the one or more links linking the second plurality of applets.

81. The method of claim 73, wherein the transformed graphical element includes an image.

82. The method of claim 73, wherein the graphical element includes a video.

83. An apparatus, comprising:
  a processor; and
  memory coupled to the processor, wherein the memory includes program instructions executable by the processor to:
    construct an electronic mail message, wherein said electronic mail message includes a first plurality of applets linked by one or more links, wherein the first plurality of applets includes a first applet configured to receive a graphical element and a second applet linked to the first applet by a first link, wherein the second applet is configured to transform the received graphical element for inclusion in the electronic mail message; and
    format the electronic mail message for transmission;
  wherein the formatted electronic mail message includes at least the second applet, but not the first applet or the first link.

84. The apparatus of claim 83, wherein said second applet includes said transformed graphical element.

85. The apparatus of claim 83, wherein at least said first applet is a Java applet.

86. The apparatus of claim 83, wherein at least said first applet is an ActiveX applet.

87. The apparatus of claim 83, wherein the memory includes program instructions executable by the processor to transmit the formatted electronic mail message.

88. The apparatus of claim 83, wherein the first plurality of applets includes a third applet linked to the first applet by a second link, and wherein the formatted electronic mail message further includes the third applet, but not the second link.

89. The apparatus of claim 83, wherein said first link is a dynamic link, and wherein said memory includes program instructions executable by the processor to break said first link.

90. The apparatus of claim 83, wherein the electronic mail message includes a second plurality of applets linked by one or more links, and wherein the formatted electronic mail message includes one or more of the second plurality of applets, and wherein the formatted electronic mail message does not include at least one of the one or more links linking the second plurality of applets.

91. A computer readable medium comprising program instructions, wherein the instructions are computer-executable to:
  construct an electronic mail message, wherein said electronic mail message includes a first plurality of applets linked by one or more links, wherein the first plurality of applets includes a first applet configured to receive a graphical element and a second applet linked to the first applet by a first link, wherein the second applet is configured to transform the received graphical element for inclusion in the electronic mail message; and format the electronic mail message for transmission;

wherein the formatted electronic mail message includes at least the second applet, but not the first applet or the first link.

92. The computer readable medium of claim 91, wherein said second applet includes said transformed graphical element.

93. The computer readable medium of claim 91, wherein at least said first applet is a Java applet.

94. The computer readable medium of claim 91, wherein at least said first applet is an ActiveX applet.

95. The computer readable medium of claim 91, wherein the instructions are computer-executable to transmit the formatted electronic mail message.

96. The computer readable medium of claim 91, wherein the first plurality of applets includes a third applet linked to the first applet by a second link, and wherein the formatted electronic mail message further includes the third applet, but not the second link.

97. The computer readable medium of claim 91, wherein said first link is a dynamic link, and wherein said instructions are computer-executable to break said first link.

98. The computer readable medium of claim 91, wherein the electronic mail message includes a second plurality of applets linked by one or more links, and wherein the formatted electronic mail message includes one or more of the second plurality of applets, and wherein the formatted electronic mail message does not include at least one of the one or more links linking the second plurality of applets.

* * * * *